(12) United States Patent
Tanaka et al.

(10) Patent No.: US 10,481,029 B2
(45) Date of Patent: Nov. 19, 2019

(54) PRESSURE SENSOR, RELAY SUBSTRATE THEREFOR, AND RELAY SUBSTRATE UNIT THEREFOR

(71) Applicant: SAGINOMIYA SEISAKUSHO, INC., Nakano-ku, Tokyo (JP)

(72) Inventors: Tatsuya Tanaka, Sayama (JP); Kazunori Hirai, Tokorozawa (JP)

(73) Assignee: Saginomiya Seisakusho, Inc. (JP)

( * ) Notice: Subject to any disclaimer, the term of this patent is extended or adjusted under 35 U.S.C. 154(b) by 151 days.

(21) Appl. No.: 15/684,127

(22) Filed: Aug. 23, 2017

(65) Prior Publication Data

US 2018/0073949 A1 Mar. 15, 2018

(30) Foreign Application Priority Data

Sep. 9, 2016 (JP) .................. 2016-176534

(51) Int. Cl.
*G01L 19/14* (2006.01)
*G01L 19/00* (2006.01)
(Continued)

(52) U.S. Cl.
CPC ........ *G01L 19/0061* (2013.01); *G01L 9/0091* (2013.01); *G01L 19/0007* (2013.01);
(Continued)

(58) Field of Classification Search
None
See application file for complete search history.

(56) References Cited

U.S. PATENT DOCUMENTS 6,003,381 A * 12/1999 Kato ............... G01L 19/146
73/721
10,072,997 B2 * 9/2018 Bubar ............. H01H 3/0226
(Continued)

FOREIGN PATENT DOCUMENTS

CN 101470038 A 7/2009
CN 201653635 U 11/2010
(Continued)

OTHER PUBLICATIONS

Office Action dated Mar. 12, 2019 in corresponding Japanese Patent Application No. 2016-176534.
(Continued)

*Primary Examiner* — Peter J Macchiarolo
*Assistant Examiner* — Jermaine L Jenkins
(74) *Attorney, Agent, or Firm* — Workman Nydegger (57) ABSTRACT

A pressure sensor is disclosed. The pressure sensor includes a pressure sensor unit provided with a pressure detecting element configured to receive a drive voltage from a control substrate and electrically send a pressure detection signal to the control substrate so as to detect a pressure of fluid, and a plurality of electric wires connected to the pressure detecting element so as to supply the drive voltage and drawn to the outside so as to send the pressure detection signal. The pressure sensor may also include a relay substrate connected to the plurality of electric wires and having a converting circuit mounted thereon. The converting circuit converts either or both of the drive voltage supplied from the control substrate and the pressure detection signal sent to the control substrate.

16 Claims, 9 Drawing Sheets

(51) Int. Cl.
*G01L 9/00* (2006.01)
*G01L 19/08* (2006.01)

(52) U.S. Cl.
CPC ........ *G01L 19/0084* (2013.01); *G01L 19/083* (2013.01); *G01L 19/086* (2013.01); *G01L 19/14* (2013.01); *G01L 19/147* (2013.01)

(56) References Cited

U.S. PATENT DOCUMENTS

| | | | |
|---|---|---|---|
| 2016/0258828 A1* | 9/2016 | Takeuchi | G01L 9/0054 |
| 2017/0131169 A1 | 5/2017 | Takimoto et al. | |
| 2017/0356815 A1* | 12/2017 | Madden | G01L 1/146 |
| 2018/0372574 A1* | 12/2018 | Lux | G01L 19/143 |

FOREIGN PATENT DOCUMENTS

| | | |
|---|---|---|
| JP | S 58-109811 A | 6/1983 |
| JP | H06-025995 U | 4/1994 |
| JP | H 06-109573 A | 4/1994 |
| JP | H 08-205536 A | 8/1996 |
| JP | 2007502011 A | 2/2007 |
| JP | 3987386 B2 | 7/2007 |
| JP | 2012-093372 A | 5/2012 |
| JP | 2013-235361 A | 11/2013 |
| JP | 2015-143672 A | 8/2015 |
| WO | WO9111687 A1 | 8/1991 |
| WO | 2015/194105 A1 | 12/2015 |

OTHER PUBLICATIONS

Office Action dated Aug. 1, 2019 in corresponding Chinese Patent Application No. 201710796973.4.
Office Action dated Aug. 13, 2019 in corresponding Japanese Patent Application No. 2016-176534.

\* cited by examiner

PRESSURE SENSOR, RELAY SUBSTRATE THEREFOR, AND RELAY SUBSTRATE UNIT THEREFOR

CROSS-REFERENCES TO RELATED APPLICATIONS

This application claims the benefit of Japanese Patent Application No. 2016-176534, filed Sep. 9, 2016, which is hereby incorporated by reference herein in its entirety.

BACKGROUND OF THE INVENTION

Field of the Invention

The present invention relates to a pressure sensor, a relay substrate therefor, and a relay substrate unit therefor, and more particularly, to a pressure sensor having a relay substrate for converting a drive voltage or a pressure detection signal, a relay substrate therefor, and a relay substrate unit therefor.

Description of the Related Art

A controlling IC or a CPU has required high versatility and low power consumption in recent years, and therefore, its drive voltage has tended to be low. For the same reason, a voltage for a control substrate, a CPU, or the like used in an air-conditioning system including an air conditioner has tended to be low.

In the meantime, a pressure sensor using a semiconductor pressure sensor has been conventionally known as a fluid pressure detecting sensor connected to the aforementioned air-conditioning system. A pressure sensor of a liquid sealed type disclosed in, for example, International Laid-Open No. WO 2015/194105 has been known as a pressure sensor using a semiconductor pressure sensor.

The pressure sensor of a liquid sealed type disclosed in International Laid-Open No. WO 2015/194105 includes, for example, a fluid introducing unit for introducing fluid whose pressure is detected into a pressure chamber, a pressure detecting unit for detecting the pressure of the fluid staying in the pressure chamber, a signal sending unit for sending a signal indicating the pressure detected by the pressure detecting unit to the outside, and a cover member for covering the fluid introducing unit, the pressure detecting unit, and the signal sending unit.

However, the tendency to reduce the drive voltage of the above-described controlling IC or CPU is different according to industries. For example, the drive voltage of a control substrate for an air-conditioning system is 3.3 V: in contrast, the drive voltage of a pressure detecting element for a pressure sensor for receiving a drive voltage from the control substrate and sending a pressure detection signal as an analog output to the control substrate is 5V.

The drive voltage of a pressure sensor currently used in a domestic air-conditioning system is mainly 5V whereas the output voltage thereof is mainly 0.5 V to 4.5 V. However, there are various drive voltages or various signal types of pressure detection signals in foreign countries as well as Japan. For example, the drive voltage is 3.3 V or ranges from 12 V to 24 V, and the like. Examples of signal types of pressure detection signals include two-wired/three-wired current output types, different voltage output types of 1 V to 5 V, a digital output type, and a radio output type.

As described above, in order to cope with various drive voltages or various signal types of pressure detection signals, a converting circuit is disposed inside of a control substrate or a pressure sensor, or ICs such as pressure detecting elements having different drive voltages are developed. These measures raise problems such as an increase in cost, fabrication of different products according to drive voltages, an increase in production unit price caused by an increase in fabrication man-hours or number of component parts, and the like.

In view of the above-described problems, an object of the present invention is to provide a pressure sensor provided with a relay substrate that can be connected to the pressure sensor and can convert a drive voltage or a pressure detection signal in order to cope with signal types of various drive voltages or various signal types of pressure detection signals, a relay substrate therefor, and a relay substrate unit therefor.

SUMMARY OF THE INVENTION

In order to solve the above-described problems, a relay substrate for a pressure sensor according to the present invention, in which the relay substrate is connected to a pressure sensor via a plurality of electric wires, is featured in that the pressure sensor includes: a pressure detecting element configured to receive a drive voltage from an outside circuit and electrically send a pressure detection signal to the outside circuit so as to detect a pressure of fluid; and an electrically connected portion connected to the pressure detecting element so as to supply the drive voltage and connected to the plurality of electric wires so as to send the pressure detection signal, wherein the relay substrate is connected to the electrically connected portion via the plurality of electric wires and comprises a converting circuit mounted thereon, the converting circuit converting either or both of the drive voltage supplied from the outside circuit and the pressure detection signal sent to the outside circuit.

Moreover, the converting circuit may include a transformer circuit for transforming the drive voltage.

Additionally, the converting circuit may include a voltage-current converting circuit for converting the signal type of pressure detection signal into a current output type.

In addition, the converting circuit may include an A/D converting circuit for converting the signal type of pressure detection signal into a digital output type.

Furthermore, the converting circuit may include a radio converting circuit for converting the signal type of pressure detection signal into a radio output type.

Moreover, the converting circuit may include a transformer circuit for transforming the voltage of the pressure detection signal.

Additionally, the relay substrate may further include a plurality of input ports to be connected to a plurality of pressure sensors.

In addition, the relay substrate may further include a plurality of output ports to be connected to a plurality of outside circuits.

In order to solve the above-described problems, a relay substrate unit for a pressure sensor according to the present invention is featured in that a relay substrate is covered with a waterproof case.

Furthermore, the relay substrate unit may be disposed near the outside circuit.

Moreover, the relay substrate unit may be disposed near the pressure sensor.

Additionally, the relay substrate may be connected to either or both of the pressure sensor and the outside circuit via a lead wire by soldering directly.

In addition, the relay substrate may be connected to either or both of the pressure sensor and the outside circuit via a connector.

In order to solve the above-described problems, a pressure sensor according to the present invention is featured by including a pressure sensor unit provided with:

a pressure detecting element configured to receive a drive voltage from an outside circuit and electrically send a pressure detection signal to the outside circuit so as to detect a pressure of fluid, and an electrically connected portion connected to the pressure detecting element and configured to supply the drive voltage and send the pressure detection signal;

a plurality of electric wires connected to the electrically connected portion; and a relay substrate connected to the plurality of electric wires and having a converting circuit mounted thereon, the converting circuit converting either or both of the drive voltage supplied from the outside circuit and the pressure detection signal sent to the outside circuit.

Furthermore, the relay substrate and the plurality of electric wires may be disposed inside of the pressure sensor.

Moreover, the relay substrate may include a two-stage step-up circuit for stepping up a voltage to a value higher than a predetermined value, and then, stepping down the voltage to the predetermined value.

The present invention can provide the pressure sensor provided with the relay substrate that can be connected to the pressure sensor and convert the drive voltage or the pressure detection signal, the relay substrate therefor, and the relay substrate unit therefor in order to cope with various drive voltages or various signal types of pressure detection signals.

Further features of the present invention will become apparent from the following description of exemplary embodiments with reference to the attached drawings.

DESCRIPTION OF THE EMBODIMENTS

Embodiments according to the present invention will be described below with reference to the attached drawings.

Figure 1:
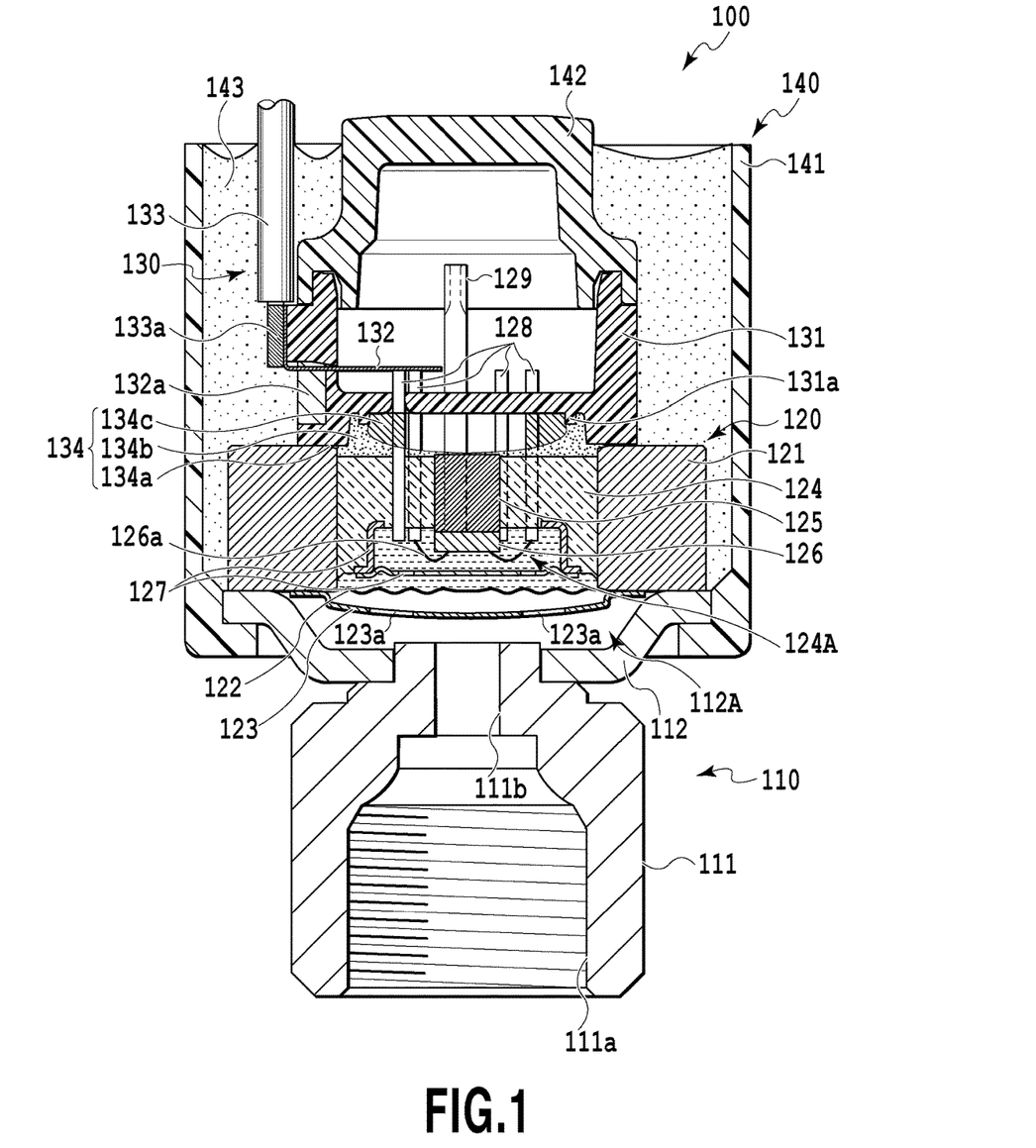
FIG. 1 is a vertical cross-sectional view showing a pressure sensor of a liquid sealed type exemplifying a pressure sensor according to the present invention.

FIG. 1 is a vertical cross-sectional view showing a pressure sensor 100 of a liquid sealed type exemplifying a pressure sensor according to the present invention.

In FIG. 1, the pressure sensor 100 of a liquid sealed type is provided with a fluid introducing unit 110 for introducing fluid whose pressure is detected to a pressure chamber 112A, described later, a pressure detecting unit 120 for detecting the pressure of the fluid staying in the pressure chamber 112A, a signal sending unit 130 for sending a signal indicating the pressure detected by the pressure detecting unit 120 to the outside, and a cover member 140 for covering the fluid introducing unit 110, the pressure detecting unit 120, and the signal sending unit 130.

The fluid introducing unit 110 includes a metallic coupling member 111 connected to a pipeline, through which fluid whose pressure is detected is guided, and a cup-like metallic base plate 112 connected to an end opposite to an end connected to the pipeline of the coupling member 111 by welding or the like.

At the coupling member 111 are formed a female screw 111a screwed into a male screw threaded at a connecting portion of the pipeline and a port 111b for guiding the fluid introduced through the pipeline into the pressure chamber 112A. The opening end of the port 111b is connected to an opening formed at the center of the base plate 112 by welding or the like. Here, although the coupling member 111 includes the female screw 111a, it may include a male screw. Alternatively, a copper connecting pipe may be connected in place of the coupling member 111. The base plate 112 is formed into a cup-like shape diverging away from the coupling member 111, and the pressure chamber 112A is defined between a diaphragm 122, described later, and the base plate 112.

The pressure detecting unit 120 includes a housing 121 having a through hole formed thereat; the diaphragm 122 for partitioning the above-described pressure chamber 112A and a liquid sealing chamber 124A, described later, from each other; a diaphragm protecting cover 123 disposed on the side of the pressure chamber 112A of the diaphragm 122; a hermetic glass 124 inserted into the through hole formed at the housing 121; the liquid sealing chamber 124A filled with silicone oil or a pressure transferring medium such as a fluorine-based inactive liquid between a recess formed at the hermetic glass 124 on the side of the pressure chamber 112A and the diaphragm 122; a strut 125 inserted into a through hole formed at the center of the hermetic glass 124; a pressure detecting element 126 fixed to the strut 125 and disposed inside of the liquid sealing chamber 124A; a potential adjusting member 127 surrounding the liquid sealing chamber 124A; a plurality of lead pins 128 fixed to the hermetic glass 124; and an oil filling pipe 129 fixed to the hermetic glass 124.

The housing 121 is made of a metallic material such as an Fe—Ni-based alloy or stainless steel. Both of the diaphragm 122 and the diaphragm protecting cover 123 are made of a metallic material, and are welded at the outer peripheral edge of the through hole on the side of the pressure chamber 112A of the housing 121. The diaphragm protecting cover 123 is disposed inside of the pressure chamber 112A for the purpose of the protection of the diaphragm 122, and has a plurality of communicating holes 123a, through which the fluid introduced by the fluid introducing unit 110 passes. After the assemblage of the pressure detecting unit 120, the housing 121 is connected at the outer peripheral edge of the base plate 112 in the fluid introducing unit 110 by welding or the like.

To the strut 125 on the side of the liquid sealing chamber 124A is adhesively secured the pressure detecting element 126 via an adhesive layer made of an adhesive. Here, although the strut 125 is made of an Fe—Ni-based alloy in the present embodiment, the present invention is not limited to this, and it may be made of other metallic materials such as stainless steel. Alternatively, no strut 125 may be provided, and the pressure detecting element 126 may be secured directly to a flat surface defining the recess formed at the hermetic glass 124. The pressure detecting element 126 is an electronic pressure sensor such as a semiconductor pressure sensor for detecting the pressure of the fluid introduced into the pressure chamber 112A from the fluid introducing unit 110 as pressure fluctuations of silicone oil staying in the liquid sealing chamber 124A via the diaphragm 122.

The potential adjusting member 127 is adapted to place the pressure detecting element 126 in a no-field (zero potential) so as to prevent a potential generated between a frame earth and a secondary power source from adversely influencing a circuit housed inside of a chip, as disclosed in Japanese Patent No. 3987386. The potential adjusting member 127 is interposed between the pressure detecting element 126 disposed inside of the liquid sealing chamber 124A and the diaphragm 122, is made of a conductive material such as metal, and is connected to a terminal connected to the zero potential of the pressure detecting element 126.

To the hermetic glass 124 are hermetically secured the plurality of lead pins 128 and the oil filling pipe 129 in a penetrating manner. In the present embodiment, there are provided eight lead pins 128 in total. Specifically, there are provided one lead pin 128 for each of outside input/output (Vout), drive voltage supply (Vcc), and a ground (GND) and five lead pins 128 serving as terminals for adjusting the pressure detecting element 126. Four out of the eight lead pins 128 are shown in FIG. 1. The plurality of lead pins 128 are connected to the pressure detecting element 126 via, for example, metal or aluminum bonding wires 126a, and thus, constitute outside input/output terminals for the pressure detecting element 126.

The oil filling pipe 129 is provided for filling the liquid sealing chamber 124A with, for example, silicone oil or a fluorine-based inactive liquid serving as a pressure transferring medium. Incidentally, one end of the oil filling pipe 129 is squashed to be closed, as indicated by a dotted line in FIG. 1, after the liquid sealing chamber 124A is filled with the oil.

The signal sending unit 130 is disposed on a side opposite to the pressure chamber 112A in the pressure detecting unit 120. The signal sending unit 130 includes a terminal mount 131 having the plurality of lead pins 128 arranged thereon; a plurality of connecting terminals 132 fixed onto the terminal mount 131 via an adhesive 132a and connected to the plurality of lead pins 128; a plurality of electric wires 133 electrically connected to the outer ends of the plurality of connecting terminals 132 by soldering or the like; and an antistatic layer 134 formed between the upper end of the housing 121 and the terminal mount 131 by using a silicone-based adhesive.

The terminal mount 131 is formed into a substantially columnar shape, has a fixing wall, onto which the above-described plurality of lead pins 128 are fixed, near the middle stage of the column, and is made of a resin material such as polybutylene terephthalate (PBT). The terminal mount 131 is secured to the upper portion of the housing 121 in the pressure detecting unit 120 via an adhesive made of, for example, an epoxy resin.

Each of the connecting terminals 132 is made of a metallic material, and is vertically secured onto a columnar side wall at an upper stage beyond the above-described fixing wall of the terminal mount 131 via the adhesive 132a. In the present embodiment, one connecting terminal 132 is provided for each of the outside input/output (Vout), the drive voltage supply (Vcc), and the ground (GND). The inner end of each of the three connecting terminals 132 is electrically connected to its corresponding lead pin 128 by welding or the like. Here, a connecting method is not limited to this, and therefore, other connecting methods may be used.

Moreover, in the present embodiment, the three electric wires 133 are connected to the three connecting terminals 132. Core wires 133a obtained by peeling a coating of the electric wire 133, the coating being made of polyvinyl chloride (PVC) or the like, is subjected to preliminary soldering, and then, the resultant strand wire is inserted into a hole formed at the outer end of the above-described connecting terminal 132, so that the electric wires 133 are electrically connected to the connecting terminals 132 by soldering, welding, or the like. The connecting method is not limited to this, and other methods may be used. The three electric wires 133 are drawn from the cover member 140 covering the pressure sensor 100, and thereafter, they are covered in a bundle with a protecting tube 135 (FIG. 5A) made of polyvinyl chloride (PVC) or the like.

The antistatic layer 134 is adapted to increase the electrostatic resistance of the pressure detecting unit 120 irrespective of the existence of an ESD protecting circuit. The antistatic layer 134 is applied to mainly the upper end surface of the housing 121 in such a manner as to cover the upper end surface of the hermetic glass 124. The antistatic layer 134 includes an annular adhesive layer 134a formed of a silicone-based adhesive in a predetermined thickness and a coating layer 134b applied to the entire upper end surface of the hermetic glass 124 having the plurality of lead pins 128 projecting therefrom and formed of a silicone-based adhesive. An annular projection 131a projects toward the hermetic glass 124 from an inner circumferential surface defining a cavity of the terminal mount 131 and facing the upper end surface of the hermetic glass 124. The projection length of the projection 131a depends upon the viscosity or the like of the coating layer 134b. The annular projection 131a is formed in the above-described fashion, and therefore, a part of the applied coating layer 134b is pulled by surface tension and is held in a narrow space defined between the projection 131a and a portion substantially perpendicular to the upper end surface of the hermetic glass 124 at the inner circumferential surface defining the cavity of the terminal mount 131. Consequently, the coating layer 134b is not deviated on one side inside of the cavity of the terminal mount 131, and thus, can be uniformly applied. Although the coating layer 134b is formed at the upper end surface of the hermetic glass 124 in a predetermined thickness, it may be formed in such a manner as to further cover some of the plurality of lead pins 128 projecting from the upper end surface of the hermetic glass 124, as shown as a portion 134c in FIG. 1.

The cover member 140 includes a waterproof case 141 formed into a substantially cylindrical shape, and covering the pressure detecting unit 120 and the signal sending unit 130, a terminal mount cap 142 capping the upper portion of the terminal mount 131, and a sealant 143 charged into a space defined by the inner circumferential surface of the waterproof case 141, the outer peripheral surface of the housing 121, and the outer peripheral surface of the terminal mount 131.

The terminal mount cap 142 is made of, for example, a resin material. The terminal mount cap 142 is formed into such a shape as to close the upper portion of the columnar terminal mount 131 in the present embodiment, and is capped over the terminal mount 131, and then, the sealant 143 such as a urethane-based resin is charged. Here, the shape of the terminal mount cap 142 is not limited to this. The terminal mount cap 142 may be formed into such a shape as to integrally close the upper portion of the terminal mount 131 and the upper portion of the waterproof case 141, and then, may cap the terminal mount cap 142 after charging the sealant 143. Alternatively, another cap member may be disposed separately from the terminal mount cap 142, and may cap over the waterproof case 141 after the terminal mount cap 142 and the sealant 143 are arranged.

The waterproof case 141 is formed into a substantially cylindrical shape with a resin material such as polybutylene terephthalate (PBT), and has a flange projecting inward at the lower end of the cylinder. The flange abuts against the outer periphery of the base plate 112 in the fluid introducing unit 110 connected to the signal sending unit 130 and the pressure detecting unit 120 that are inserted through the opening formed at the upper portion of the waterproof case 141. In this state, the waterproof case 141 is filled with the sealant 143, and thus, component parts contained inside such as the pressure detecting unit 120 are secured.

Here, although the pressure sensor according to the present invention is exemplified by the pressure sensor 100 of a liquid sealed type in the present embodiment, it is not limited to this. The present invention is applicable to all pressure sensors including a pressure detecting element that receives a drive voltage from the outside and electrically sends a pressure detection signal to the outside.

Figure 5A:
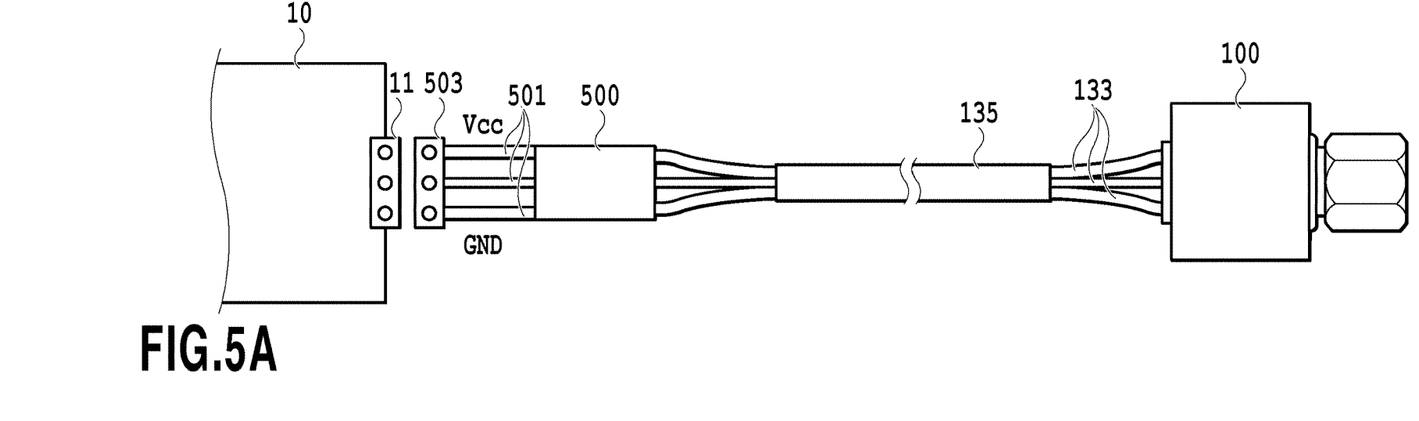
FIG. 5A is a constitutional view showing a state in which the relay substrate for the pressure sensor according to the present invention is connected between the pressure sensor and a control substrate and onto the side of the control substrate.
Figure 5B:
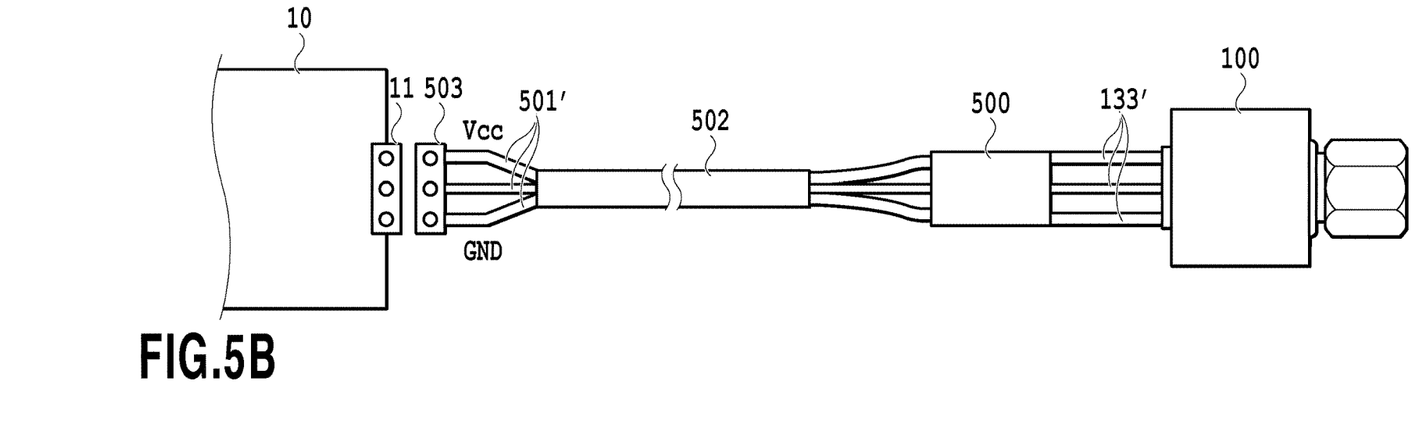
FIG. 5B is a constitutional view showing a state in which the relay substrate for the pressure sensor according to the present invention is connected between the pressure sensor and the control substrate and onto the side of the pressure sensor.

As shown in FIG. 5A and FIG. 5B, described later, the pressure sensor 100 may be connected to an outside circuit such as the control substrate 10 for an air-conditioning system including an air conditioner suitable for various drive voltages or various signal types of pressure detection signals. Therefore, in order to cope with various drive voltages or various signal types of pressure detection signals, the pressure sensor 100 according to the present invention is featured by including a relay substrate 500 having a converting circuit for converting drive voltages or signal types of pressure detection signal mounted thereon. The converting circuit mounted on the relay substrate 500 will be described below.

Figure 2A:
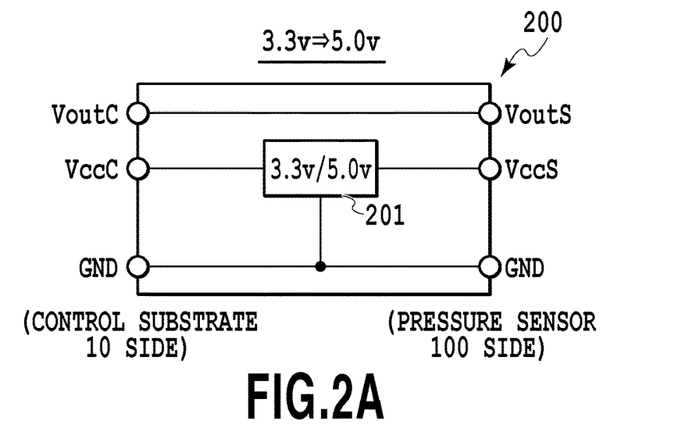
FIG. 2A is a block diagram illustrating a one-stage conversion step-up circuit for a drive voltage, the step-up circuit being mounted on a relay substrate for the pressure sensor according to the present invention.
Figure 2B:
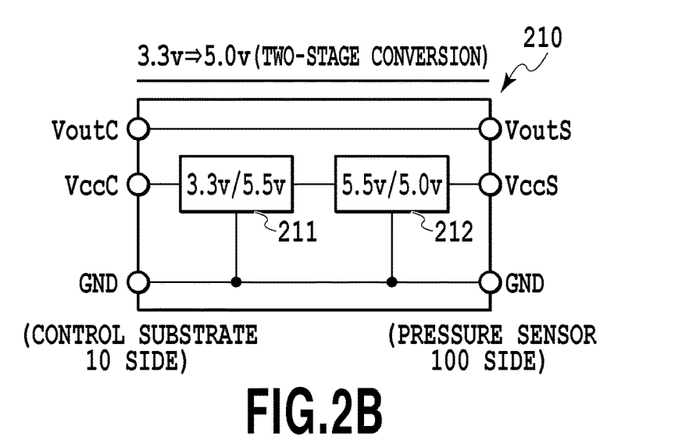
FIG. 2B is a block diagram illustrating a two-stage conversion step-up circuit for a drive voltage.

FIG. 2A is a block diagram illustrating a one-stage conversion step-up circuit 200 for a drive voltage, the step-up circuit 200 being mounted on the relay substrate 500 for the pressure sensor 100 according to the present invention; FIG. 2B is a block diagram illustrating a two-stage conversion step-up circuit 210 for a drive voltage; and FIG. 2C is a block diagram illustrating a step-down circuit 220 for a drive voltage.

In FIG. 2A, the converting circuit 200 is a drive voltage one-stage conversion step-up circuit including a step-up circuit 201 for stepping up a drive voltage VccC of 3.3 V in the control substrate 10 up to a drive voltage VccS of 5.0 V in the pressure detecting element 126. In the case where the drive voltage VccS in the pressure sensor 100 is higher than the drive voltage VccC in the control substrate 10, the relay substrate 500 having the step-up circuit 201 mounted thereon is connected between the control substrate 10 and the pressure sensor 100, thus absorbing a difference in drive voltage without any design change such as addition of a component part to the control substrate 10 and the pressure sensor 100.

In FIG. 2B, the converting circuit 210 is a drive voltage two-stage conversion step-up circuit including a step-up circuit 211 for stepping up the drive voltage VccC of the control substrate 10 from 3.3 V to 5.5 V and a step-down circuit 212 for stepping down the drive voltage VccS of the pressure detecting element 126 from 5.5 V to 5.0 V. In this manner, the use of the two-stage conversion step-up circuit that steps up a voltage from a predetermined value to a higher value and then steps down it to the predetermined value enables the voltage to be converted into the target drive voltage VccS of the pressure detecting element 126 with high accuracy.

Figure 2C:
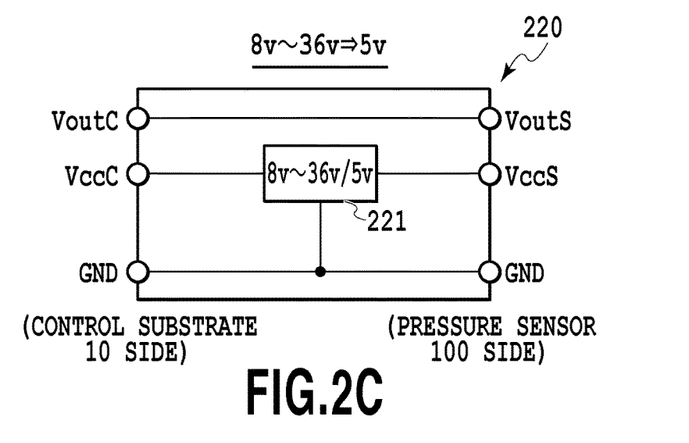
FIG. 2C is a block diagram illustrating a step-down circuit for a drive voltage.

In FIG. 2C, the converting circuit 220 is a drive voltage step-down circuit including a step-down circuit 221 for stepping down the drive voltage VccC of the control substrate 10 from 8 V-36 V to 5.0 V of a drive voltage VccS of the pressure detecting element 126. In this manner, like in foreign countries, in the case where the drive voltage of the control substrate 10 is higher than 5.0 V of the drive voltage VccS of the pressure detecting element 126, the connection of the relay substrate 500 having the step-down circuit 221 mounted thereon between the control substrate 10 and the pressure sensor 100 can absorb a difference in drive voltage without any design change such as addition of component parts to the control substrate 10 or the pressure sensor 100.

Figure 3A:
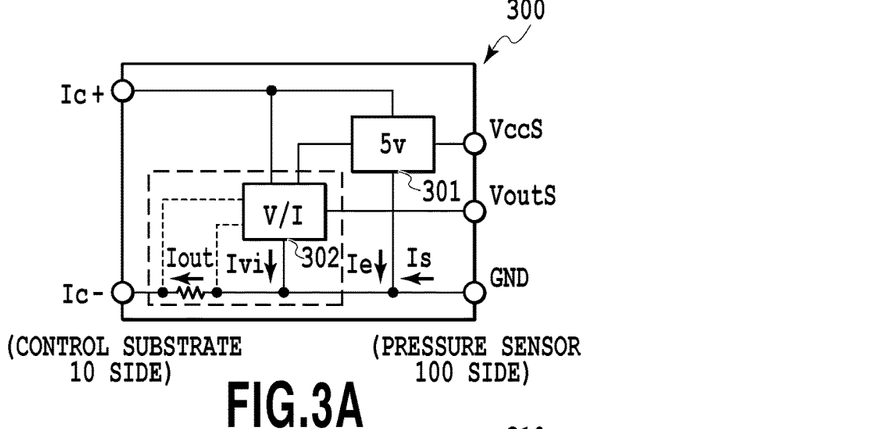
FIG. 3A is a block diagram illustrating a two-wired type current output circuit of a floating type for a pressure detection signal, the current output circuit being mounted on the relay substrate for the pressure sensor according to the present invention.
Figure 3B:
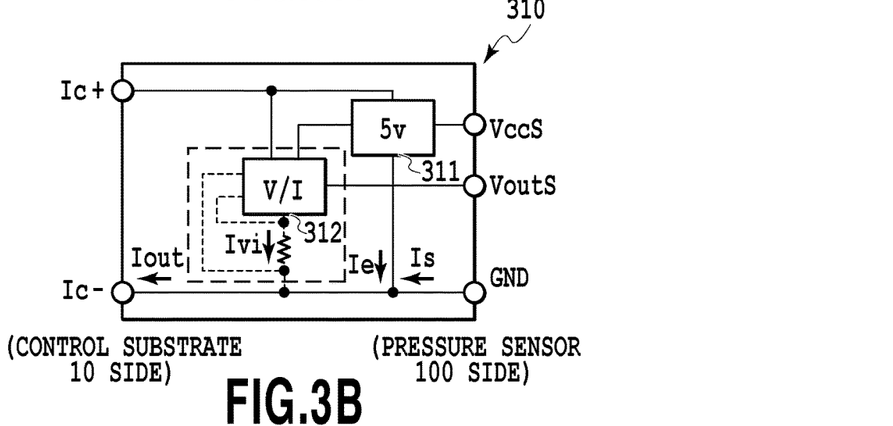
FIG. 3B is a block diagram illustrating a two-wired type current output circuit for a pressure detection signal.
Figure 3C:
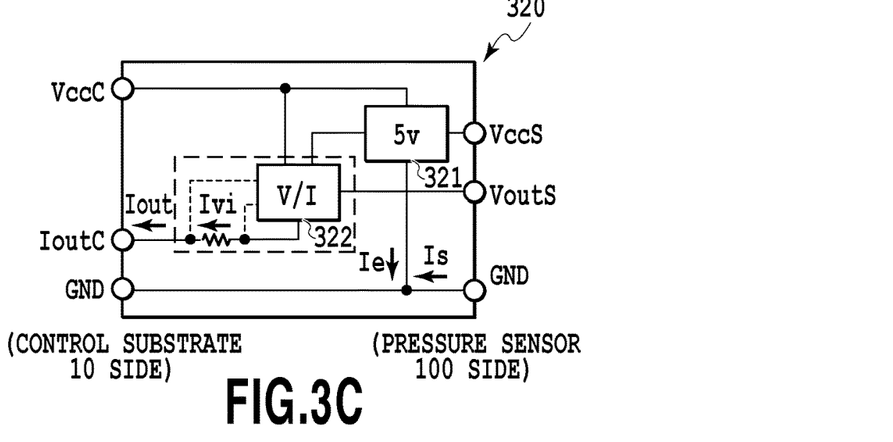
FIG. 3C is a block diagram illustrating a three-wired type current output circuit for a pressure detection signal.

FIG. 3A is a block diagram illustrating a two-wired type current output circuit 300 of a floating type of pressure detection signal, the current output circuit 300 being mounted on the relay substrate 500 for the pressure sensor 100 according to the present invention; FIG. 3B is a block diagram illustrating a two-wired type current output circuit 310 for a pressure detection signal; and FIG. 3C is a block diagram illustrating a three-wired type current output circuit 320 for a pressure detection signal.

In FIG. 3A, the converting circuit 300 is a two-wired type current output circuit of a floating type of pressure detection signal, including a transformer circuit 301 having a drive voltage of 5 V and a V/I circuit 302. An output current Iout in the circuit illustrated in FIG. 3A is expressed by the following equation:

$$Iout = Ivi + Is + Ie \quad (1)$$

(where Ivi: V/I converting circuit current; Is: pressure sensor consumption current; and Ie: other circuit consumption currents)

The V/I circuit 302 can output an output current IoutC in proportion to the output voltage VoutS of the pressure sensor even in the case where the pressure sensor consumption current Is or the other circuit consumption currents Ie are varied so as to feed back a current value Iout. When a current IoutC flows in a current detecting resistor, a voltage is generated across a resistor, and thus, voltages at a terminal Ic- and a terminal GND float. This circuit is called a floating circuit that is effective in the case where the pressure sensor consumption current Is or the other circuit consumption currents Ie are unstable.

In FIG. 3B, the converting circuit 310 is a two-wired type current output circuit for a pressure detection signal, the converting circuit 310 including a transformer circuit 311 having a drive voltage of 5 V and a V/I circuit 312. An output current Iout of the circuit illustrated in FIG. 3B is expressed by the following equation:

$$Iout = Ivi + Is + Ie \quad (2)$$

(where Ivi: V/I converting circuit current; Is: pressure sensor consumption current; and Ie: other circuit consumption currents)

The converting circuit 310 is a feasible circuit in the case where the pressure sensor consumption current Is and the other circuit consumption currents Ie are constant. The V/I circuit 312 can be implemented with a simple configuration because it simply controls the current Ivi in proportion to the pressure sensor output voltage Vout. Since no current detecting resistor is interposed between the Ic- and the GND, the potentials of the Ic- and the GND are the same as each other.

In FIG. 3C, the converting circuit 320 is a three-wired type current output circuit for a pressure detection signal, the converting circuit 320 including a transformer circuit 321 having a drive voltage of 5 V and a V/I circuit 322. The output current Iout of the circuit illustrated in FIG. 3C is expressed by the following equation:

$$Iout = Ivi \quad (3)$$

In the two-wired type converting circuits 300 and 310, the sum, Is+Ie, should be less than a lower limit of a required output current. In contrast, the three-wired type converting circuit 320 has no such restriction, and therefore, it can be applied to various uses, although it has a complicated configuration.

Figure 4A:
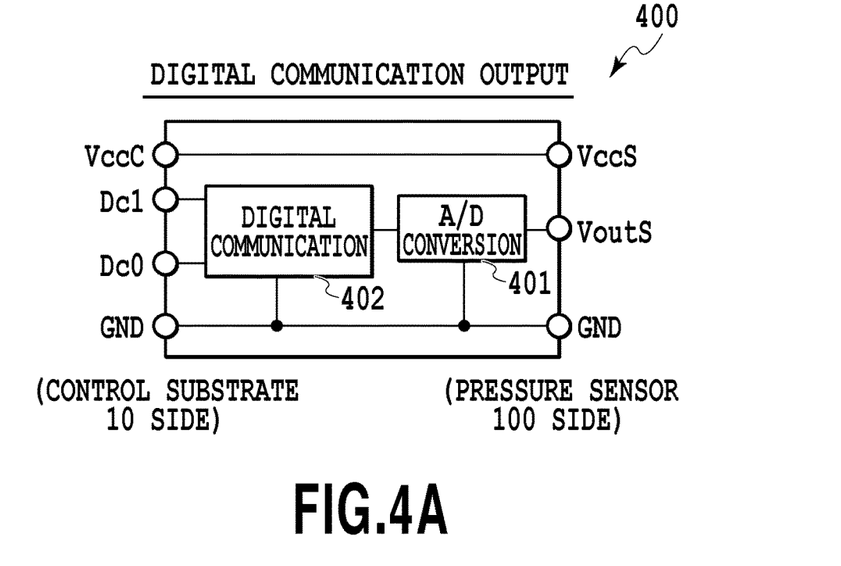
FIG. 4A is a block diagram illustrating a digital output circuit for a pressure detection signal, the digital output circuit being mounted on the relay substrate for the pressure sensor according to the present invention.
Figure 4B:
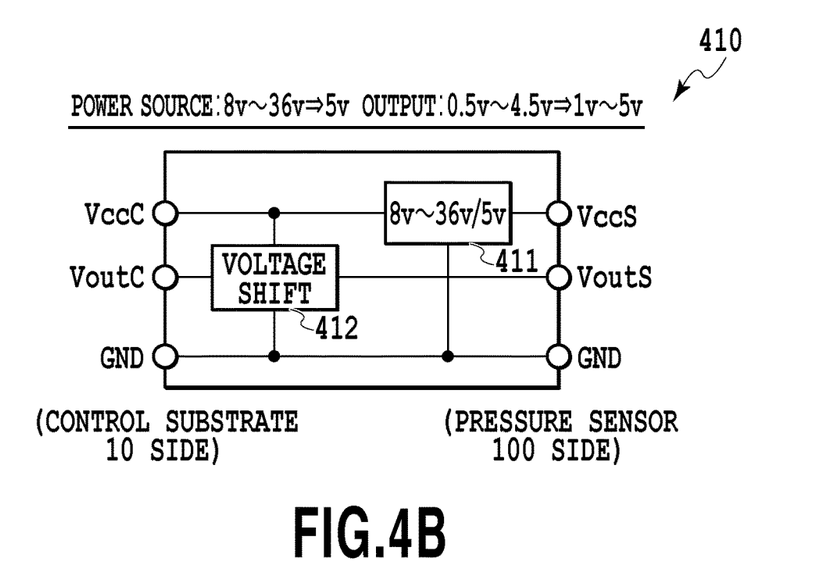
FIG. 4B is a block diagram illustrating a transformer circuit for transforming both of a drive voltage and a pressure detection signal.

FIG. 4A is a block diagram illustrating a digital output circuit 400 for a pressure detection signal, the digital output circuit 400 being mounted on the relay substrate 500 for the pressure sensor 100 according to the present invention; and FIG. 4B is a block diagram illustrating a transformer circuit 410 for transforming both of a drive voltage and a pressure detection signal.

In FIG. 4A, the converting circuit 400 is a digital output circuit for a pressure detection signal, the converting circuit 400 including an A/D converting circuit 401 for a drive voltage and a digital communication circuit 402. In this manner, since the relay substrate 500 has the digital output circuit for performing A/D conversion mounted thereon, the pressure sensor 100 can be connected to the control substrate 10 of a digital output type.

In FIG. 4B, the converting circuit 410 is a transformer circuit including a step-down circuit 411 for stepping down 8 V-36 V of a drive voltage VccC of the control substrate 10 to 5.0 V of a drive voltage VccS of the pressure detecting element 126 and a voltage shifting circuit 412 for stepping up 0.5 V-4.5 V of a pressure detection signal VoutS of the pressure sensor to 1 V-5 V of a pressure detection signal VoutC of the control substrate 10. In this manner, the relay substrate 500 has the step-down circuit 411 for a drive voltage and the voltage shifting circuit 412 for a pressure detection signal mounted thereon, and therefore, differences in drive voltage and pressure detection signal can be absorbed without any design change such as addition of component parts to the control substrate 10 and the pressure sensor 100.

Here, the converting circuits illustrated in FIG. 2A through FIG. 4B are just examples but not restrictions. The converting circuit may be appropriately changed according to the specifications of the pressure sensor 100 and the specifications of the control substrate 10. Alternatively, the above-described converting circuits may be combined with each other. In addition, if a radio communication module such as a radio LAN or WiFi is mounted on the relay substrate 500, radio communication connection can be achieved.

FIG. 5A is a constitutional view showing a state in which the relay substrate 500 for the pressure sensor 100 according to the present invention is connected onto the side of the control substrate 10 between the pressure sensor 100 and the control substrate 10; and FIG. 5B is a constitutional view showing a state in which the relay substrate 500 for the pressure sensor 100 according to the present invention is connected onto the side of the pressure sensor 100 between the pressure sensor 100 and the control substrate 10.

In FIG. 5A, the three electric wires 133 for Vcc, GND, and Vout drawn to the outside of the pressure sensor 100 are covered with the protecting tube 135, and then, are connected to the relay substrate 500. The relay substrate 500 is connected to the control substrate 10 via a plurality of electric wires 501 in the number according to the above-described converting circuit. At this time, the connection between the control substrate 10 and the plurality of electric wires 501 may be achieved by connecting a connector 11 disposed at the control substrate 10 and a connector 503 disposed at the tips of the plurality of electric wires 501.

The relay substrate 500 connected to the pressure sensor 100 installed outdoors also is generally installed outdoors. In this case, the relay substrate 500 may be covered with a waterproof case 601 or 701 having waterproofness such as a hot melt material, as shown in FIGS. 6A to 6D and FIGS. 7A to 7D, described later. Here, a polyamide-based hot melt material suitable for low-temperature molding is desirable, and furthermore, a polyolefin-based hot melt material or a wet-curable type urethane-based hot melt material may be used. At this time, when the relay substrate 500 is installed near the control substrate 10 housed inside of an air-conditioning system, waterproofing measures such as roofs are generally taken for the air-conditioning system, thereby leading to cost reduction without any need to enhance the waterproofness of the above-described waterproof case 601 or 701.

In contrast, when the relay substrate 500 is located apart from the control substrate 10 housed inside of the air-conditioning system, that is, near the pressure sensor 100, as shown in FIG. 5B, the waterproofness of the waterproof case 601 or 701 needs to be enhanced whereas there arises an advantage that the control substrate 10 hardly undergoes noise radiated from the air-conditioning system or the control substrate 10.

Moreover, in the case where the pressure detection signal is transmitted by a voltage output type, troubles such as occurrence of a voltage drop or an adverse influence of noise are more liable to arise as the plurality of electric wires 133 or 501 serving as paths become longer. In contrast, the signal is hardly influenced by noise in the case where the pressure detection signal is transmitted by a current output type using the current output circuits illustrated in FIG. 3A through FIG. 3C. Consequently, it is desirable that the relay substrate 500 should be disposed near the pressure sensor 100, as shown in FIG. 5B.

Although illustration is omitted, the relay substrate 500 may be housed inside of the cover member 140 of the pressure sensor 100. In this case, the waterproof case 601 or 701, described later, is not needed. The relay substrate 500 is protected by the waterproofness of the pressure sensor 100, resulting in cost reduction. In the same manner, also in the case where the relay substrate 500 is housed inside of the air-conditioning system near the control substrate 10, the waterproof case 601 or 701 is not needed, resulting in cost reduction.

Figure 6A:
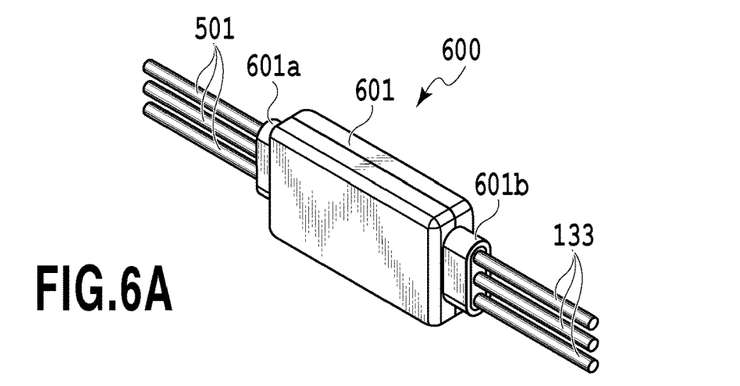
FIG. 6A is a perspective view showing the relay substrate unit for the pressure sensor according to the present invention, the relay substrate unit being connected by a lead wire connection method.
Figure 6B:
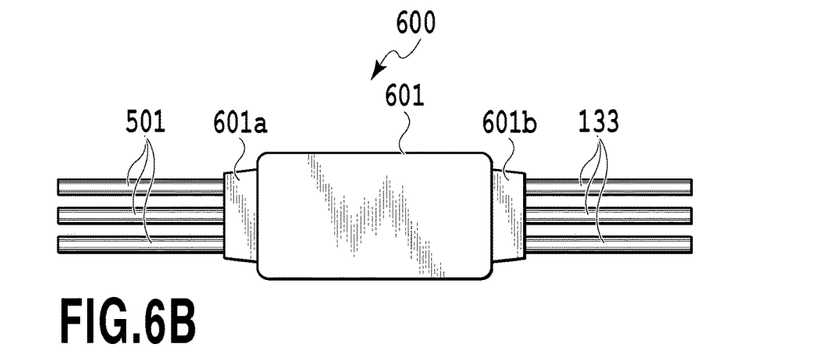
FIG. 6B is a front view showing the relay substrate unit shown in FIG. 6A.
Figure 6C:
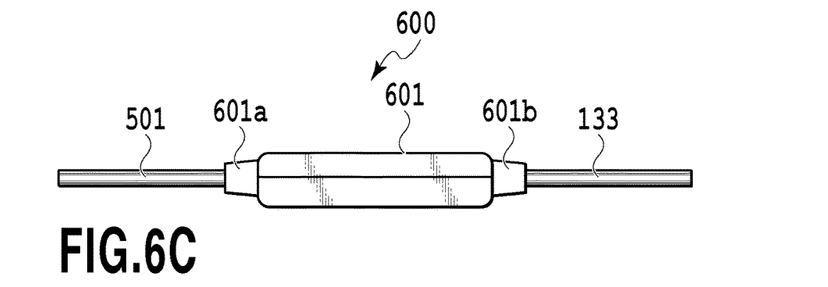
FIG. 6C is a top view showing the relay substrate unit shown in FIG. 6A.
Figure 6D:
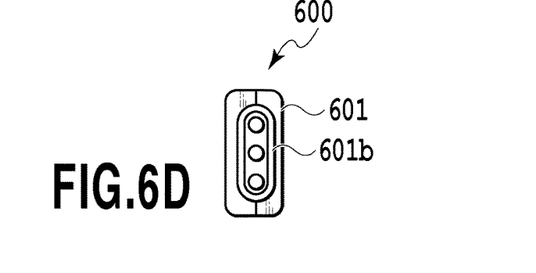
FIG. 6D is a side view showing the relay substrate unit shown in FIG. 6A.

FIG. 6A is a perspective view showing a relay substrate unit 600 for the pressure sensor 100 according to the present invention, the relay substrate unit 600 being connected by a lead wire connection type; FIG. 6B is a front view showing the relay substrate unit 600 shown in FIG. 6A; FIG. 6C is a top view showing the relay substrate unit 600 shown in FIG. 6A; and FIG. 6D is a side view showing the relay substrate unit 600 shown in FIG. 6A.

In FIG. 6A through FIG. 6D, in the relay substrate unit 600 for the pressure sensor 100, the relay substrate 500 shown in FIG. 5A and FIG. 5B is covered with the waterproof case 601 made of a hot melt material. Here, although the waterproof case 601 is made of a hot melt material, the material is not limited to this. Any materials having waterproofness may be used, such as resin materials and metallic materials.

In the relay substrate unit 600, the relay substrate 500 contained therein and the plurality of electric wires 133 and 501 are connected directly to each other by soldering or the like. With this configuration, cost can be reduced. Moreover, the plurality of electric wires 133 and 501 are drawn from the inside of the waterproof case 601 to the outside. For the purpose of this, a connecting portion 601a on a control substrate side and a connecting portion 601b on a sensor side, both being openings, are formed at the waterproof case 601.

Figure 7A:
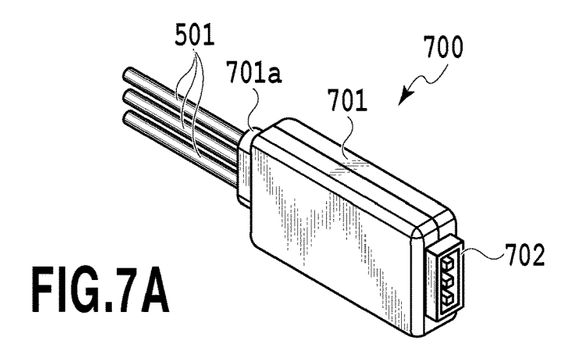
FIG. 7A is a perspective view showing the relay substrate unit for the pressure sensor according to the present invention, the relay substrate unit being connected by a connector connection type.
Figure 7B:
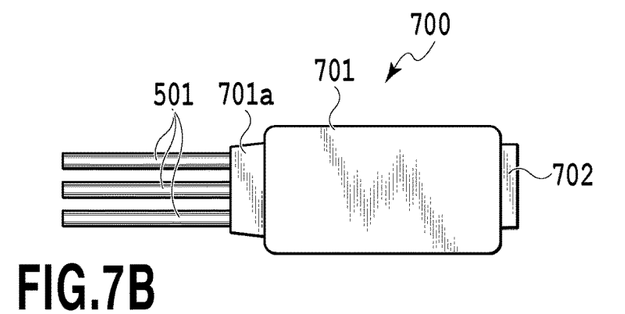
FIG. 7B is a front view showing the relay substrate unit shown in FIG. 7A.
Figure 7C:
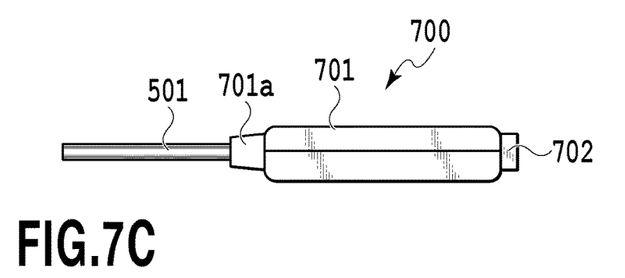
FIG. 7C is a top view showing the relay substrate unit shown in FIG. 7A.
Figure 7D:
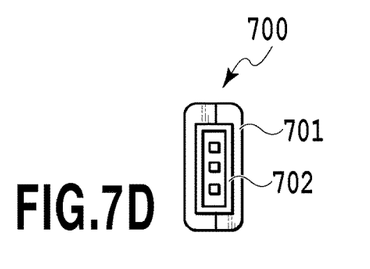
FIG. 7D is a side view showing the relay substrate unit shown in FIG. 7A.

FIG. 7A is a perspective view showing a relay substrate unit 700 for the pressure sensor 100 according to the present invention, the relay substrate unit 700 being connected by a connector connection type; FIG. 7B is a front view showing the relay substrate unit 700 shown in FIG. 7A; FIG. 7C is a top view showing the relay substrate unit 700 shown in FIG. 7A; and FIG. 7D is a side view showing the relay substrate unit 700 shown in FIG. 7A.

In FIG. 7A through FIG. 7D, in the relay substrate unit 700 for the pressure sensor 100, the relay substrate 500 shown in FIG. 5A and FIG. 5B is covered with a waterproof case 701 made of a hot melt material. By comparison, the relay substrate unit 700 is identical in constituent elements to the relay substrate unit 600 except that the former is provided with a connector 702 for connection to the plurality of electric wires 133 on a sensor side. Similar constituent elements are designated by the same reference numerals, and therefore, their explanation will be omitted below.

In the relay substrate unit 700, providing the connector 702 dispenses with forming an opening, through which a plurality of bendable electric wires 133 pass, at the waterproof case 701, thus bringing an advantage of the ease in enhancing waterproofness. Here, although the connector 702 is provided for connecting the plurality of electric wires 133 on a pressure sensor 100 side, the present invention is not limited to this. A connector may be provided for connecting a plurality of electric wires 501 on a control substrate side or two connectors may be provided for connecting the plurality of electric wires 133 and 501 on both sides.

Next, a description will be given of examples in which the relay substrate is provided with a plurality of input ports or a plurality of output ports.

Figure 8A:
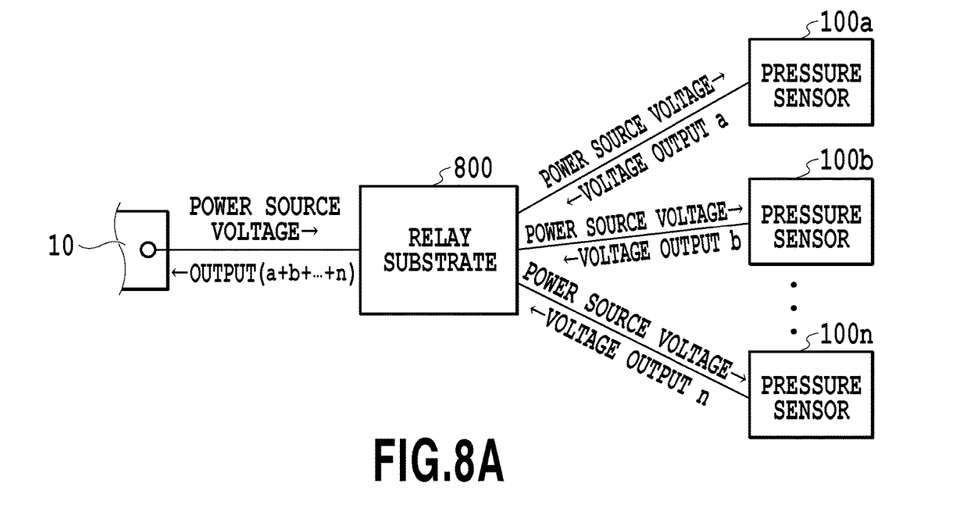
FIG. 8A is a diagram illustrating a configuration including a relay substrate having a plurality of input ports.
Figure 8B:
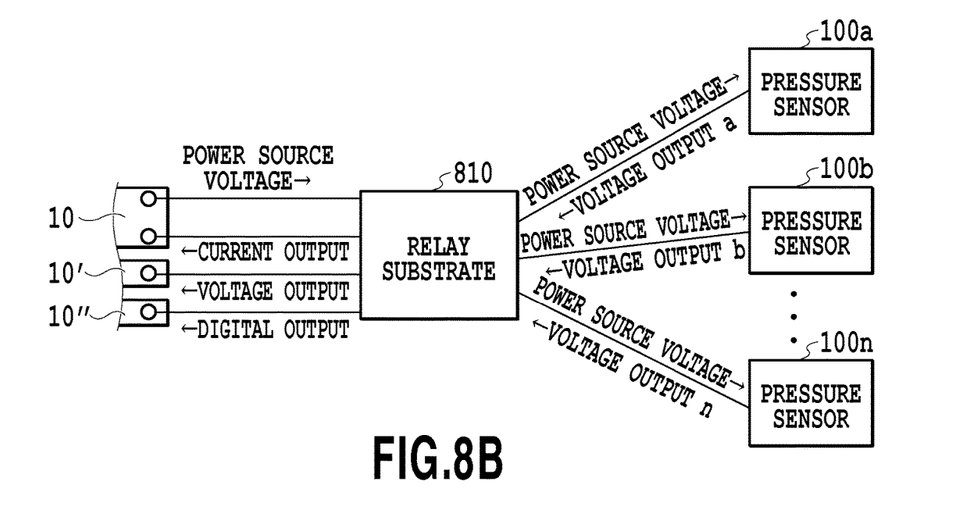
FIG. 8B is a diagram illustrating a configuration including a relay substrate having a plurality of input ports and a plurality of output ports of different output types.
Figure 9A:
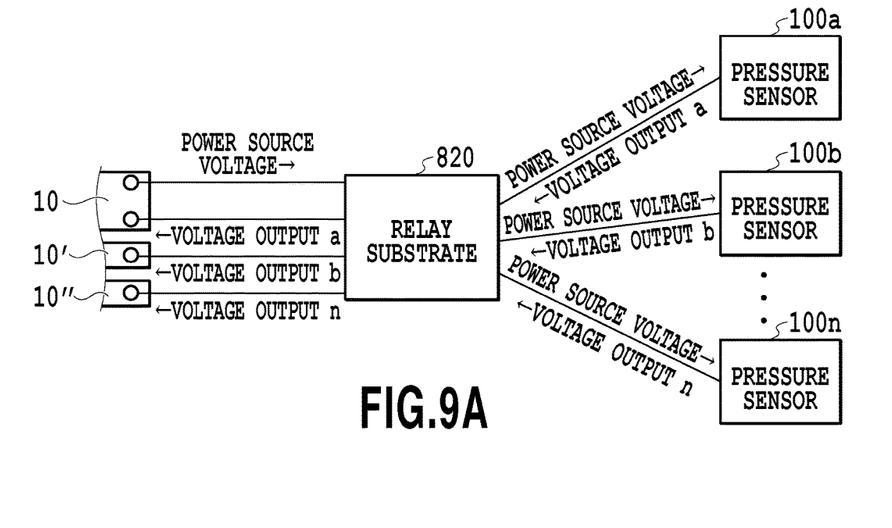
FIG. 9A is a diagram illustrating a configuration including a relay substrate having a plurality of input ports and a plurality of output ports of the same output type.
Figure 9B:
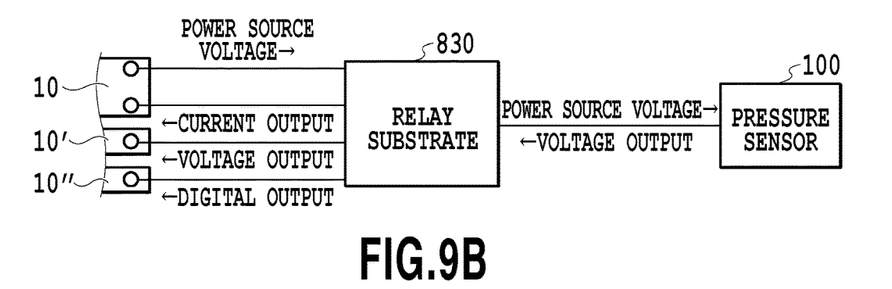
FIG. 9B is a diagram illustrating a configuration including a relay substrate having a single input port and a plurality of output ports of different output types.
Figure 9C:
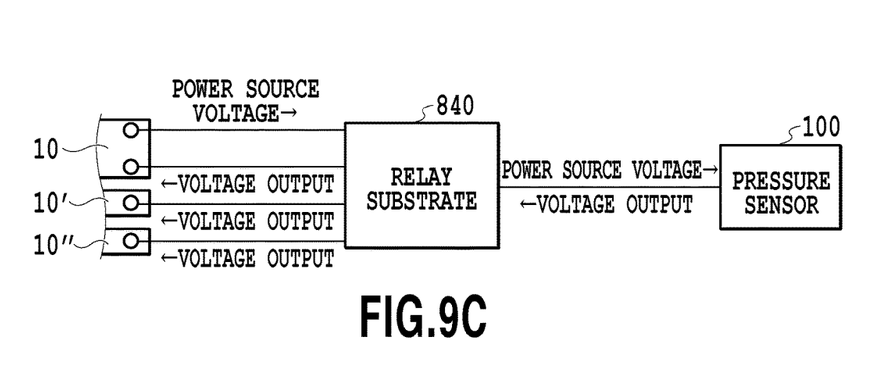
FIG. 9C is a diagram illustrating a constitutional view showing a configuration including a relay substrate having a single input port and a plurality of output ports of the same output type.

FIG. 8A is a diagram illustrating a configuration including a relay substrate 800 having a plurality of input ports; FIG. 8B is a diagram illustrating a configuration including a relay substrate 810 having a plurality of input ports and a plurality of output ports of different output types; FIG. 9A is a diagram illustrating a configuration including a relay substrate 820 having a plurality of input ports and a plurality of output ports of the same output type; FIG. 9B is a diagram illustrating a configuration including a relay substrate 830 having a single input port and a plurality of output ports of different output types; and FIG. 9C is a diagram illustrating a configuration including a relay substrate 840 having a single input port and a plurality of output ports of the same output type.

In FIG. 8A, the relay substrate 800 is provided with a plurality of input ports, through which the relay substrate 800 is connected to a plurality of pressure sensors 100a, 100b, . . . and 100n. Moreover, the relay substrate 800 is provided with a single output port, through which pressure detection signals are sent from the plurality of pressure sensors 100a, 100b, . . . and 100n to the control substrate 10. Examples of a signal sending type include a digital output type and an output type for summing the pressure detection signals output from the plurality of pressure sensors 100a, 100b, and 100n. In this manner, the use of the relay substrate 800 can achieve the configuration of a pressure sensor module having the plurality of pressure sensors 100a, 100b, . . . and 100n and the single control substrate 10 connected to each other by a simple method.

In FIG. 8B, the relay substrate 810 is provided with a plurality of input ports, through which the relay substrate 810 is connected to a plurality of pressure sensors 100a, 100*b*, . . . and 100*n*. Moreover, the relay substrate 810 is provided with a plurality of output ports of different output types, through which pressure detection signals are sent from the plurality of pressure sensor 100*a*, 100*b*, . . . and 100*n* to a plurality of control substrates 10, 10', and 10". In terms of a signal sending type, although a current output type, a voltage output type, or a digital output type may be selected here, the present invention is not limited to this. In this manner, the use of the relay substrate 810 achieves a configuration in which pressure detection signals output from the plurality of pressure sensors 100*a*, 100*b*, . . . and 100*n* are sent to the plurality of control substrates 10, 10', and 10" via the relay substrate 810 by a simple method. Here, although the relay substrate 810 is connected to the plurality of control substrates 10, 10', and 10", the present invention is not limited to this. All pressure detection signals may be output from a plurality of pressure sensors 100*a*, 100*b*, . . . and 100*n* to a single control substrate 10 by different output types.

In FIG. 9A, the relay substrate 820 is provided with a plurality of input ports, through which it is connected to a plurality of pressure sensors 100*a*, 100*b*, . . . and 100*n*. The relay substrate 820 is further provided with a plurality of output ports of the same output type corresponding to the plurality of input ports. The pressure detection signals output from the plurality of pressure sensors 100*a*, 100*b*, . . . and 100*n* are sent to the plurality of control substrates 10, 10', and 10" through the plurality of output ports. Here, although a voltage output type is selected as a signal sending type, the present invention is not limited to this. In this manner, the use of the relay substrate 820 achieves a configuration in which the pressure detection signals are sent from the plurality of pressure sensors 100*a*, 100*b*, . . . and 100*n* to the plurality of control substrates 10, 10', and 10" through the relay substrate 820 by a simple method.

In FIG. 9B, the relay substrate 830 is provided with a single input port, through which the relay substrate 830 is connected to a single pressure sensor 100. Moreover, the relay substrate 830 is provided with a plurality of output ports of different output types, through which a pressure detection signal output from the above-described single pressure sensor 100 is sent to a plurality of control substrates 10, 10', and 10". Here, although a signal sending type is selected from a current output type, a voltage output type, and a digital output type, the present invention is not limited to this. In this manner, the use of the relay substrate 830 achieves a configuration in which a pressure detection signal output from the single pressure sensor 100 is sent to the plurality of control substrates 10, 10', and 10" via the relay substrate 830 in different output types by a simple method.

In FIG. 9C, the relay substrate 840 is provided with a single input port, through which the relay substrate 840 is connected to a single pressure sensor 100. Moreover, the relay substrate 840 is provided with a plurality of output ports of the same output type. A pressure detection signal output from the above-described single pressure sensor 100 is sent to the plurality of control substrates 10, 10', and 10" via the plurality of output ports. Here, although a voltage output type is selected as a signal sending type, the present invention is not limited to this. In this manner, the use of the relay substrate 840 achieves a configuration in which the pressure detection signal output from the single pressure sensor 100 is sent to the plurality of control substrates 10, 10', and 10" via the relay substrate 840 by the same output type by a simple method.

In the above-described manners, the relay substrate is provided with the plurality of input ports or the plurality of output ports, thus achieving the configuration for connecting the plurality of pressure sensors or the plurality of control substrates by the simple methods without any design change or an increase in the number of component parts.

As described above, the present invention can provide the pressure sensor provided with the relay substrate that can be connected to the pressure sensor and can convert the drive voltage or the pressure detection signal in order to cope with the various drive voltages or the various signal types of pressure detection signals, the relay substrate therefor, and the relay substrate unit therefor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A relay substrate for a pressure sensor, in which the relay substrate is connected to a pressure sensor via a plurality of electric wires, the pressure sensor including:
a pressure detecting element configured to receive a drive voltage from an outside circuit and electrically send a pressure detection signal to the outside circuit so as to detect a pressure of fluid; and
an electrically connected portion connected to the pressure detecting element so as to supply the drive voltage and connected to the plurality of electric wires so as to send the pressure detection signal,
wherein the relay substrate is connected to the electrically connected portion via the plurality of electric wires and comprises a converting circuit mounted on the relay substrate, the converting circuit converting either or both of the drive voltage supplied from the outside circuit and the pressure detection signal sent to the outside circuit.

2. The relay substrate for the pressure sensor according to claim 1, wherein the converting circuit includes a transformer circuit for transforming the drive voltage.

3. The relay substrate for the pressure sensor according to claim 1, wherein the converting circuit includes a voltage-current converting circuit for converting the signal type of pressure detection signal into a current output type.

4. The relay substrate for the pressure sensor according to claim 1, wherein the converting circuit includes an A/D converting circuit for converting the signal type of pressure detection signal into a digital output type.

5. The relay substrate for the pressure sensor according to claim 1, wherein the converting circuit includes a radio converting circuit for converting the signal type of pressure detection signal into a radio output type.

6. The relay substrate for the pressure sensor according to claim 1, wherein the converting circuit includes a transformer circuit for transforming the voltage of the pressure detection signal.

7. The relay substrate for the pressure sensor according to claim 1, further comprising a plurality of input ports to be connected to a plurality of pressure sensors.

8. The relay substrate for the pressure sensor according to claim 1, further comprising a plurality of output ports to be connected to a plurality of outside circuits.

9. A relay substrate unit for a pressure sensor, comprising the relay substrate according to claim 1 covered with a waterproof case.

10. The relay substrate unit for the pressure sensor according to claim 9, wherein the relay substrate unit is disposed near the outside circuit.

11. The relay substrate unit for the pressure sensor according to claim 9, wherein the relay substrate unit is disposed near the pressure sensor.

12. The relay substrate unit for the pressure sensor according to claim 9, wherein the relay substrate is connected to either or both of the pressure sensor and the outside circuit via a lead wire by soldering directly.

13. The relay substrate unit for the pressure sensor according to claim 9, wherein the relay substrate is connected to either or both of the pressure sensor and the outside circuit via a connector.

14. A pressure sensor comprising:
a pressure sensor unit including:
a pressure detecting element configured to receive a drive voltage from an outside circuit and electrically send a pressure detection signal to the outside circuit so as to detect a pressure of fluid, and
an electrically connected portion connected to the pressure detecting element and configured to supply the drive voltage and send the pressure detection signal;
a plurality of electric wires connected to the electrically connected portion; and
a relay substrate connected to the plurality of electric wires and having a converting circuit mounted on the relay substrate, the converting circuit converting either or both of the drive voltage supplied from the outside circuit and the pressure detection signal sent to the outside circuit.

15. The pressure sensor according to claim 14, wherein the relay substrate and the plurality of electric wires are disposed inside of the pressure sensor.

16. The pressure sensor according to claim 15, wherein the relay substrate includes a two-stage step-up circuit for stepping up a voltage to a value higher than a predetermined value, and then, stepping down the voltage to the predetermined value.

* * * * *